United States Patent Office 2,778,793
Patented Jan. 22, 1957

2,778,793
MANUFACTURE OF SILICONE ELASTOMERS WITH THE AID OF A SILENT DISCHARGE

Frederick L. Thomas and Francis F. Koblitz, Madison, Wis., assignors to Bjorksten Research Laboratories, Inc., a corporation of Illinois No Drawing. Application July 19, 1952,
Serial No. 299,914

3 Claims. (Cl. 204—165)

This invention relates to the production of transparent silicone elastomers and to methods of further strengthening and cross-linking them.

Heretofore siloxane elastomers have been made which are not transparent but which are merely translucent with about 6% light transmission or less in a 250 mil film but which otherwise show desirable properties, such as having a tensile strength 600 p. s. i. or more at 100° C., being flexible at —50° C. and being resistant to heat and air at 200° C. Usually the silicone rubbers contain some inorganic matter as filler to increase strength and heat resistance.

Nowhere has such a silicone rubber been made which is fully transparent or which could be used as an interlayer material for aircraft glazing components. Transparent silicones exist which are flexible but which are not of sufficient strength and elasticity.

Under the existing art dialkyl or diaryl silanes, or combinations of the two, of the structure:

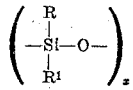

(which are cyclic if $x$ is from 3 to 8 and both R's are methyl) or the analogous di-hydroxy monomer with both R's being aryl are opened up in the former case and condensed in the latter by means of strong mineral acids or alkalies or iron chloride to long chain elastomers. These may be "cured" by means of organic peroxides, lead or manganese naphthenates, lead, mercury, zinc, selenium and titanium oxides, which remain in the rubber and seriously interfere with its light transmission.

We have found that dialkyl siloxanes, and substituted dialkyl siloxanes in which the substituted groups are phenyl, vinyl, allyl, hydrogen or hydroxyl (or free radical formed when OH is split off, i. e., Si— or —Si—O—) can be treated by methods now to be described which appear to show improvement commonly described as "cross-linking" and which do not seriously interfere with the transparent quality of the silicone elastomer so as to prevent its being used as an interlayer (i. e. less than 90% light transmission in ¼" thick film).

The cyclic siloxane monomer oil or the condensed siloxane elastomer gum or any combination of these two is treated with strong hydrogen peroxide. Wetting agents may be used provided they do not form color forming residues or are removed later. The strength of the peroxide can vary from 3% thru 99%. 30% is a practically convenient strength. Sodium peroxide can likewise be used alone or in combination with sodium hydroxide during the condensation stage of the process. $Na_2CO_3.2H_2O_2$ is also useful.

The oil or gum as described in the previous paragraph can be treated with a "silent discharge." Such a discharge is produced by current coming from the electrodes of a Tesla coil or from high frequency high voltage charges when the electrodes are brought into proximity. The film thickness can vary from 200–300° up to ¼" but works best in the region of 5 to 20 mils. The gap between the electrode is ⅛" for a 15,000 volt, 30 milliampere secondary and 115 volt A. C. primary transformer.

Ultra-violet light such as that which comes from a pressurized quartz tube-mercury type burner without the nickel oxide filter-giving spectrum from 2200° A. to 4000° A. is effective on cyclic siloxane monomer oil or condensed siloxane elastomer gum or any combination of these two. Film thickness can vary from units described previously but 20 mils to 100 mils is a preferable range. No catalyst or dust must be present as the combination clings to the surface causing discoloration.

Chlorination in presence of near ultra-violet light with or without replacement of chlorine by hydroxyl or removal of chloromethyl groups by hydrolysis with alkali, moisture and heat is helpful. Other applicable methods for removal of chlorine or chloromethyl groups are, for example, fusion with potassium or sodium acetate to form esters and subsequent hydrolysis of esters to —Si—CH$_2$OH structures. However removal of such groups must be performed on the final polymer after it has achieved high molecular weights.

The usual cross-linking agents reactive to a primary hydroxyl group are necessary. A few basic types are listed below by way of example.

1. Chloro silanes:

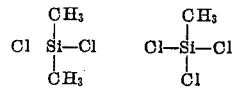

2. Alkoxy silanes: Na+Si(—O—Et)$_4$

With catalyst: CH$_3$O—Na—(removed later)

3. Dibasic acids: Oxalic through adipic acid. Acids of high molecular weight of aliphatic character enhance optical clarity where used as cross-linkers, therefore oxalic, malonic, maleic, fumaric and succinic acids are preferred.

4. Dialdehydes, such as glyoxal.

5. Glycols such as ethylene glycol although the —OH group does not enhance surface wettability with siloxane or optical clarity and must be used under drastic conditions or with a wetting agent.

In the past, fillers have been incorporated into siloxane resins for the purpose of increasing the tensile strength and elasticity when curing these resins by peroxides.

Now, however, it has been found that the tensile strength of siloxane resins can be increased, at the same time preserving their transparency, by curing these resins between plates which have an inorganic filler bonded to their surface. The filler exerts its catalytic effect on the surface of thin films while not actually entering the resin itself.

The invention is further illustrated by the following specific examples:

Example I 50 parts octa methyl tetra siloxane and 20 parts diphenyl silane diol were reacted in a covered glass vessel with a motor stirrer.

To 100 parts of the polymer obtained, which is believed to be a cyclic substance, was added 1 part of concentrated sulfuric acid. The resulting compound was mixed 2 hours at 120–130° C. Subsequently it was washed thoroughly with water by kneading in a porcelain vessel and was then milled in a suitable roller mill. The resultant composition was then dried and placed between two electrodes spaced .03" apart and charged with the maximum amount of voltage which could be applied without perforation of the mass. Usually about 15,000 volts is a suitable amount for this purpose although much higher voltages have been used.

After four hours the composition was removed. The product was still transparent, and was insoluble in petroleum ether (B. P.: 30 to 60° C.) while the original cyclic derivative was readily soluble in this solvent and the pure siloxane gum untreated was more than 75% soluble. Thus a cross-linkage had taken place with resultant improvement in strength and resistance to solvents, but without loss of optical clarity.

*Example II*

100 grams of octa methyl tetra siloxane (B. P.: 171 to 170° C.) (Ref. index: 1.3935—25/D) was mixed with 1 gram of chemically pure concentrated sulfuric acid (sp. gr. 1.84) in a closed heated reaction vessel equipped with a glass stirrer capable of vigorous agitation. The mass was stirred and heated at 125° C. for 12 hours at which time a sample removed and tested in Brookfield viscosimeter indicated 10,000 cps. The agitation and heat was continued until 25 hours at which time the viscosity was greater than 2,000,000 cps. The elastomer gum was removed and washed on cadmium plated screw-type rollers until free of $H_2SO_4$ as indicated by $Ba(NO_3)_2$ di-ethyl ether, MeOH, $H_2O$ solution.

The excess water was removed in a dessicator by evacuation.

To 10 grams of dried washed gum 0.25 gram of benzoyl peroxide was mixed on above rollers. The resultant paste was spread out on aluminum sheets separated by shims and pressed 4 hours at 105° C. under hydraulic pressure, at which time the gum had become a 6 mil transparent homogeneous elastic sheet which adhered readily to glass. The rupture strength of this sheet as obtained by clamping tightly over a ¼″ round hole was 3 to 4 lbs. up to 6 to 7 lbs. per square inch air pressure. The corresponding strength for the untreated but washed and dried gum was less than one pound per square inch.

Light transmission was unmeasurable with an Eastman photographic densitometer because of the thinness of the sheet. However, sheets of 27 to 30 mils thickness exhibited less than 0.04 optical density or greater than 90% light transmission.

*Example III*

10 grams of gum as described in Example II were mixed with 0.50 gram of ditertiary butyl peroxide. The mass was pressed between aluminum sheets for 3 hours at 150° C. The 6 mil films obtained were tested for rupture strength as in Example II and had a strength of 41 lbs. per square inch or 41 times as great as the untreated material. Optical density 33 mil film 0.06 or 87% light transmission.

*Example IV*

10 grams of washed, dried gum described in Example II were dissolved in 100 grams of $CCl_4$ and placed in a 1 liter reaction flask equipped with a gas inlet tube and ultra violet mercury arc light inserted in one of the openings. Agitation was started and chlorine admitted together with 9 times its volume of dry nitrogen. After two hours the solvent was removed and samples analyzed for chlorine by sodium peroxide fusion. 0.5 to 0.75% chlorine had been absorbed. The gum had a faint straw color, part of the gum was pressed into films with Grignard of ethylene bromide which cross-linked it to a tough mass. However, the major portion was fused with 50 parts glacial acetic and 50 parts of potassium acetate. The gum was separated, washed free of acid, dried and heated with oxalic acid under slight vacuum to distill off acetic acid. Later it was removed and pressed between aluminum sheets for 4 hours at 100° C. A tough flexible transparent film was thus formed.

*Example V*

The 6 mil sheets prepared as in Example II were dipped in ethyl ortho silicate and hung up to dry on glass rods in a closed drying oven at 45° C. After 20 hours the strength had increased to 5.83 rupture strength, whereas the original was 4.75 lbs. The control exposed to air at room temperature for a similar period increased in strength to 5.0 lbs./sq. inch. Optical density was unchanged.

*Example VI*

The 6 mil sheets prepared as in Example II were dipped in methyl triethoxy silane and hung up to dry on glass rods in a closed drying oven at 45° C. After 20 hours, the strength increased to 5.14 lbs./sq. inch.

*Example VII*

The 6 mil sheets prepared in Example II were dipped in a 1% solution in MeOH in Aerosol OT, a wetting agent, drained dry and dipped into a solution of 30% $H_2O_2$ for 2 hours. After removal and drying the rupture strength increased from 4.50 to 4.75 lbs./sq. inch. to 7.0 to 7.5 lbs./sq. inch and the optical density remained unchanged.

*Example VIII*

The elastomer gum of Example II is pressed into thin sheets which are placed in a bell jar and chlorine gas is passed through the jar for 10 hours.

The sheets are found to have increased in strength and to be transparent.

*Example IX*

100 parts of elastomer gum of Example II is milled on a rubber mill for 6 hours together with 3 parts of $AlCl_3$ to produce a compound having enhanced properties.

*Example X*

The procedure of Example II is carried out with aluminum sheets which are dipped in $MgClO_4$ prior to their use in pressing the paste.

*Example XI*

100 parts of a linear polysiloxane having a viscosity of greater than 2,000,000 centipoises was intimately mixed with 2.5 parts of benzoyl peroxide. It was then cured four hours at 100° C. between silicone rubber containing 200% by weight of titanium dioxide. The final film thickness was 0.006 inch.

Four thicknesses of this film were laminated to give a film which had greater than 90% light transmission.

*Example XII*

A trifluoro chloro ethylene and titanium dioxide suspension were coated on glass plates and then baked. 100 parts of a polysiloxane were mixed with 2.5 parts of benzoyl peroxide and cured between these plates at 100° C. for 4 hours. The final thickness of the film was 0.006 inch.

Four thicknesses of this film were laminated to give a film which had greater than 90% light transmission.

*Example XIII*

100 parts of octamethyl tetra-siloxane are placed in a reaction vessel and stirred rapidly while one part of sulfuric acid (sp. gr. 1.86) is added. The vessel is heated at 125° C. for 24 hours, at which time the gum is removed. The viscosity of the gum is greater than 2,000,000 centipoises.

The gum is then dissolved in petroleum ether, washed free of free sulfuric acid by 25% methanol and water, and dried of solvent by vacuum evacuation at 0.0001 mm. of mercury at room temperature.

100 parts of the dried gum is then mixed intimately with benzoyl peroxide and pressed 4 hours at 100° C. to a film thickness of .006 inch between aluminum sheets.

Four thicknesses of the cured gum are coated lightly with an adhesive and recured 1 hour at 150° C.

The resulting laminated film has greater than 90% light transmission and withstands a pressure of 30 pounds of air pressure per quarter inch of surface.

The processes shown in the examples can be used to make sheets up to ⅛" thick.

*Example XIV*

A cross-linked transparent polymeric derivative of octamethyl tetra-siloxane is made by mixing about 50 parts of octamethyl tetra-siloxane with about 20 parts of diphenyl silane diol, mixing the product with about 1 part of concentrated sulphuric acid, washing, milling and drying the resultant compound and then passing a silent electric alternating current at about 15,000 volts through the resultant mass.

From the above disclosure it is apparent that the process is of wide applicability and is not to be restricted excepting by the claims, in which it is our intention to cover all novelty inherent in this invention as broadly as possible, in view of prior art. Having thus disclosed our invention, we claim:

1. A process of preparing a transparent polysiloxane resin, which comprises the step of exposing a linear transparent polydialkyl siloxane gum to a silent electrical discharge of about 15,000 volts.

2. The process of making a cross-linked transparent polymeric derivative of octa methyl tetra siloxane comprising mixing octa methyl tetra siloxane with diphenyl silane diol, mixing the product with a small quantity of sulfuric acid, washing, milling and drying the resultant compound and then passing a silent electric alternating current discharge at about 15,000 volts through the resultant mass.

3. The process of making a cross-linked transparent polymeric derivative of octa methyl tetra siloxane comprising mixing about 50 parts of octa methyl tetra siloxane with about 20 parts of diphenyl silane diol, mixing the product with about 1 part of concentrated sulphuric acid, washing, milling and drying the resultant compound and then passing a silent electric alternating current discharge at about 15,000 volts through the resultant mass.

References Cited in the file of this patent

UNITED STATES PATENTS

| | | |
|---|---|---|
| 614,500 | Ramage | Nov. 22, 1898 |
| 1,098,356 | Ramage | May 26, 1914 |
| 2,481,052 | Warrick | Sept. 6, 1949 |
| 2,521,528 | Marsden | Sept. 5, 1950 |
| 2,541,137 | Warrick | Feb. 13, 1951 |
| 2,596,085 | Wormuth | May 6, 1952 |

OTHER REFERENCES

Rochow, An Introduction to The Chemistry of the Silicones, Wiley 1946, pg. 77.

Rochow, Chemistry of the Silicones, 2nd ed., Wiley, 1951, pg. 74.